(No Model.)
J. P. EUSTIS.
GRADUATED MEASURING VESSEL.
No. 476,136. Patented May 31, 1892.
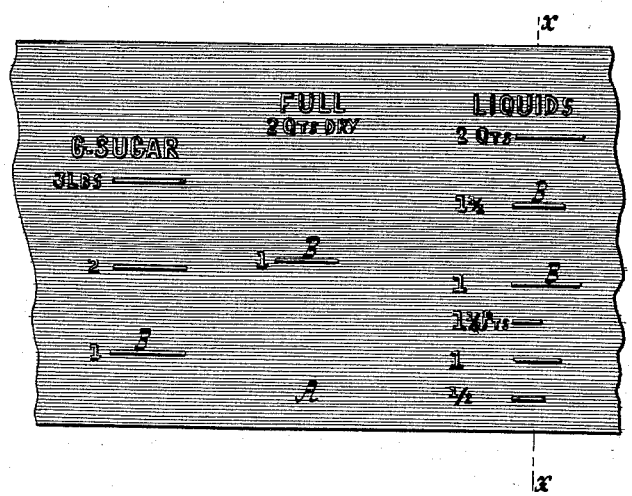
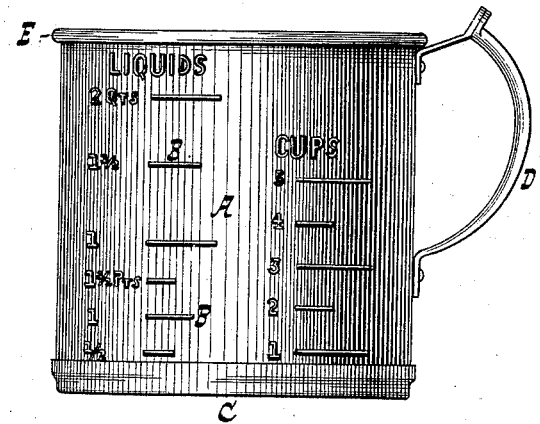
WITNESSES:
William J. Miller
Edward Wolff
INVENTOR:
John P. Eustis.
BY
Van Santwood & Hauff
his ATTORNEYS

UNITED STATES PATENT OFFICE.

JOHN P. EUSTIS, OF NEW YORK, N. Y.

GRADUATED MEASURING-VESSEL.

SPECIFICATION forming part of Letters Patent No. 476,136, dated May 31, 1892.

Application filed August 25, 1891. Serial No. 403,680. (No model.)

*To all whom it may concern:*

Be it known that I, JOHN P. EUSTIS, a citizen of the United States, residing at New York, in the county and State of New York, have invented new and useful Improvements in Measures, of which the following is a specification.

This invention relates to a vessel or receptacle which is adapted for measuring; and the invention consists in the details of construction set forth in the following specification and claims and illustrated in the annexed drawings, in which—

Figure 1 shows a piece of sheet metal used in forming the body of the measure. Fig. 2 is a section along $x$ $x$, Fig. 1. Fig. 3 is an elevation of the vessel.

In forming the measure I take a flat piece of sheet metal A, Fig. 1, and expose said metal to the action of suitable dies. Said dies are provided with independent graduated scales, which become reproduced upon the metal sheet, as seen in Fig. 1. When the metal sheet has been thus treated, it is bent or shaped so as to form a vessel-body, Fig. 3, after which it is provided with a bottom and a handle to complete the measure.

The scales or their subdivisions are indicated by lines or marks B, which are embossed upon or indented in the metal sheet A. By such embossing or indenting of the lines B, together with the designations of the scales, said designations and lines become apparent on the interior as well as the exterior of the vessel, so that although the vessel is opaque it can be readily ascertained whether the vessel contains the proper supply of the desired material.

The lines or marks B, it is noticed, extend in each case along only a part of the body or metal sheet A. I am aware that measures have been made with the lines extending entirely about the body of the measure to indicate subdivisions of one scale; but when several independent scales or graduations are employed such extended lines are not practical, since, for example, the line indicating one cup, if extended, would interfere with the line indicating one-half a pint, so as to cause confusion. By making the lines B sufficiently short a large number of independent graduations can be applied to the measure without said various graduations interfering with one another.

To give a neat finish to the measure, it is not only provided with a bottom C and handle D, but also with a bead E.

What I claim as new, and desire to secure by Letters Patent, is—

1. A measure consisting of an opaque vessel having a series of independent graduated lines of weights and measures indented thereinto, so that they are visible inside and outside the vessel, substantially as described.

2. A measure consisting of a metallic vessel having a series of independent scales of weights and measures formed by indentations in the metal to render the scales visible inside and outside thereof, substantially as described.

In testimony whereof I have hereunto set my hand in the presence of two subscribing witnesses.

JOHN P. EUSTIS.

Witnesses:
OWEN WARD,
JOSEPH A. BOKEE.